United States Patent
Jiang et al.

(10) Patent No.: US 11,044,615 B2
(45) Date of Patent: Jun. 22, 2021

(54) METHOD AND DEVICE IN UE AND BASE STATION USED FOR MULTI-ANTENNA WIRELESS COMMUNICATION

(71) Applicants: Qi Jiang, Shanghai (CN); XiaoBo Zhang, Shanghai (CN)

(72) Inventors: Qi Jiang, Shanghai (CN); XiaoBo Zhang, Shanghai (CN)

(73) Assignee: SHANGHAI LANGBO COMMUNICATION TECHNOLOGY COMPANY LIMITED, Shanghai (CN)

(*) Notice: Subject to any disclaimer, the term of this patent is extended or adjusted under 35 U.S.C. 154(b) by 165 days.

(21) Appl. No.: 16/393,988

(22) Filed: Apr. 25, 2019

(65) Prior Publication Data
US 2019/0306727 A1 Oct. 3, 2019

Related U.S. Application Data

(63) Continuation of application No. PCT/CN2017/108324, filed on Oct. 30, 2017.

(30) Foreign Application Priority Data

Nov. 1, 2016 (CN) .......................... 201610935861.8

(51) Int. Cl.
*H04W 16/28* (2009.01)
*H04B 7/0413* (2017.01)
(Continued)

(52) U.S. Cl.
CPC .......... *H04W 16/28* (2013.01); *H04B 7/0413* (2013.01); *H04W 16/18* (2013.01); *H04W 24/02* (2013.01)

(58) Field of Classification Search
CPC ..... H04W 16/28; H04W 16/18; H04W 24/02; H04B 7/0413; H04B 7/0632; H04B 7/0417; H04L 5/006; H04L 5/0091
See application file for complete search history.

(56) References Cited

U.S. PATENT DOCUMENTS

| 2013/0343220 | A1* | 12/2013 | Chun | H04B 7/0626 370/252 |
| 2014/0153426 | A1* | 6/2014 | Kim | H04L 5/0023 370/252 |
| 2018/0309496 | A1* | 10/2018 | Lee | H04L 5/0053 |

FOREIGN PATENT DOCUMENTS

| CN | 102056220 A | 5/2011 |
| CN | 104937874 A | 9/2015 |

(Continued)

OTHER PUBLICATIONS

ISR received in application No. PCT/CN2017/108324 dated Jan. 29, 2018.

(Continued)

*Primary Examiner* — Kiet Tang

(57) ABSTRACT

The disclosure provides a method and a device in a User Equipment (UE) and a base station for wireless communication. The UE first receives a first information set, the first information set including K1 target offsets; next, the UE receives K1 target radio signals in K1 target time-frequency resource sets respectively; and then the UE determines K1 first-type channel qualities. The K1 target radio signals are transmitted by K1 antenna port sets respectively. Measurements for the K1 target radio signals are used for determining K1 second-type channel qualities respectively. The disclosure designs and differentiates access rules of the K1 antenna port sets through the design of the target offsets, thereby optimizing the number of UEs served by the antenna port sets and optimizing the channels transmitted by the (Continued)

antenna port sets, and increasing system transmission efficiency.

20 Claims, 8 Drawing Sheets

(51) Int. Cl.
   *H04W 24/02* (2009.01)
   *H04W 16/18* (2009.01)

(56) References Cited

FOREIGN PATENT DOCUMENTS

| | | |
|---|---|---|
| CN | 105322995 A | 2/2016 |
| CN | 105659508 A | 6/2016 |
| CN | 106033986 A | 10/2016 |
| CN | 106034360 A | 10/2016 |

OTHER PUBLICATIONS

CN 1st Office Action received in application No. 201610935861.8 dated Apr. 18, 2019.
CN Notice of Allowance received in application No. 201610935861.8 dated Sep. 20, 2019.
CN Search report received in application No. 201610935861.8 dated Apr. 4, 2019.

\* cited by examiner

METHOD AND DEVICE IN UE AND BASE STATION USED FOR MULTI-ANTENNA WIRELESS COMMUNICATION

CROSS-REFERENCE TO RELATED APPLICATION

This application is a continuation of International Application No. PCT/CN2017/108324, filed Oct. 30, 2017, claiming the priority benefit of Chinese Patent Application Serial Number 201610935861.8, filed on Nov. 1, 2016, the full disclosure of which is incorporated herein by reference.

BACKGROUND

Technical Field

The disclosure relates to transmission schemes of radio signals in wireless communication systems, and in particular to a method and a device for wireless communication.

Related Art

In conventional wireless communication systems based on digital modulation modes, for example, in 3rd Generation Partner Project (3GPP) cellular systems, a User Equipment (UE) generally acquires Reference Signal Received Powers (RSRPs) or Reference Signal Received Qualities (RSRQs) of multiple cells through Primary Synchronization Signals (PSSs), Secondary Synchronization Signals (SSSs) and Cell Reference Signals (CRSs), and makes the base station with highest RSRP or RSRQ an access base station and receives services in the access base station.

In discussions of Release 10 and Release 11 heterogeous networks, in order to let more UEs access a picocell to realize cell splitting gains, cell-specific access offsets are introduced. When the RSRP of a picocell plus an offset is greater than the RSRP of a macrocell, a UE accesses the picocell preferentially. With this method, when more picocells are deployed under one macrocell, greater cell splitting gains may be realized, and spectrum efficiency may be improved.

SUMMARY

In 5G systems, massive Multiple Input Multiple Output (MIMO) and corresponding Beamforming (BF) technologies will be widely used. One base station or Transmission Reception Point (TRP) probably will be configured with many antenna ports. In such cases, one access mode is that all antenna port sets under one base station or TRP employ the same access rules, that is to say, when one UE accesses one base station or one TRP, the UE will be served by all antenna ports of the base station or TRP. However, when each antenna port under one base station or TRP has a different coverage characteristic, or when different antenna ports provide different types of services, the above access mode is obviously not the most reasonable and efficient.

In view of the above problems, the disclosure provides a solution. It should be noted that the embodiments of the disclosure and the characteristics in the embodiments may be mutually combined if no conflict is incurred. For example, the embodiments of the UE of the disclosure and the characteristics in the embodiments may be applied to the base station, and vice versa The disclosure provides a method in a UE for wireless communication, wherein the method includes:

receiving a first information set, the first information set including K1 target offsets;

receiving K1 target radio signals in K1 target time-frequency resource sets respectively; and determining K1 first-type channel qualities.

Herein, the K1 target radio signals are transmitted by K1 antenna port sets respectively; measurements for the K1 target radio signals are used for determining K1 second-type channel qualities respectively; and any target offset of the K1 target offsets is in unit of decibel. The K1 is a positive integer greater than 1; the K1 second-type channel qualities are one-to-one corresponding to the K1 target offsets; one second-type channel quality and one corresponding target offset are used for determining one first-type channel quality; the antenna port set includes a positive integer number of antenna ports; the K1 antenna port sets are Quasi Co-Located (QCLed), or the K1 target radio signals are associated with the same cell identifier; and the K1 first-type channel qualities are one-to-one corresponding to the K1 antenna port sets.

In one embodiment, the above method has a first advantage as follows: through the design of the K1 different target offsets, the disclosure designs and differentiates access rules of the K1 antenna port sets; when the K1 antenna port sets are used for transmission of channels with different coverage requirements or provide services with different performance requirements, through the configuration of the different target offsets, access to the antenna port sets is optimized and system transmission efficiency is improved.

In one embodiment, the above method has a second advantage as follows: among antenna ports included in one same base station or TRP, a first-type antenna port set provides services with good robustness or services with large coverage, and a second-type antenna port set provides services with high spectrum efficiency and high transmission rate. The target offsets corresponding to the first-type antenna ports are relatively high, that is to say, thresholds corresponding to the access rules are relatively low, so that more UEs can access. The target offsets corresponding to the second-type antenna ports are relatively low, that is to say, thresholds corresponding to the access rules are relatively high, which only allows the access of UEs with good channel conditions. This approach can realize the first advantage described above.

In one embodiment, the above method has a third advantage as follows: among antenna ports included in one same base station or TRP, multiple antenna port sets are configured, and multiple different target offsets are configured for different antenna port sets so as to meet multiple different transmission requirements. This method can more flexibly update the antenna ports in the antenna port sets and the target offsets corresponding to the antenna port sets, so as to better adapt to changes in transmission requirements.

In one embodiment, the target radio signal includes at least one of a target signature sequence and a target reference signal.

In one embodiment, the cell identifier is a Physical Cell Identifier (PCID).

In one embodiment, the QCLed refers to Quasi Co-Located.

In one embodiment, the phase that the K1 antenna port sets are QCLed refers that: large-scale properties of channels transmitted from a second antenna port can be deduced from large-scale properties of channels transmitted from a first antenna port. The large-scale properties include one or more of delay spread, Doppler spread, Doppler shift, average gain and average delay. The first antenna port and the second antenna port both belong to the K1 antenna port sets; specifically, the first antenna port and the second antenna port belong to two different antenna port sets among the K1 antenna port sets.

In one embodiment, the phase that the K1 target radio signals are associated with the same cell identifier refers that: the target radio signal includes a reference signal, and the cell identifier is used for generating a Reference Signal (RS) sequence corresponding to the reference signal.

In one subembodiment, the RS sequence is a pseudorandom sequence, and the cell identifier is used for an initialization value of a generator generating the RS sequence of the reference signal.

In one subembodiment, the cell identifier is used for scrambling of the RS sequence.

In one embodiment, the phase that the K1 target radio signals are associated with the same cell identifier refers that: the target radio signal includes a signature sequence, the cell identifier is used for generating the signature sequence, and the signature sequence includes at least one of a pseudorandom sequence and a Zadoff-Chu sequence.

In one embodiment, the cell identifier is greater than or equal to 0, but less than or equal to 504.

In one embodiment, the antenna port set includes one antenna port only.

In one embodiment, the antenna port is formed by a positive integer number of antennas through antenna virtualization, and the target offset is related to the number of antennas of the corresponding antenna port set.

In one embodiment, the target offset is related to the number of antenna arrays of the corresponding antenna port set.

In one subembodiment, the target offset decreases with the increase of the number of antenna arrays of the corresponding antenna port set.

In one embodiment, the target offset is related to a beam width corresponding to the antenna ports in the corresponding antenna port set.

In one subembodiment, the bigger is the target offset, the larger is the beam width corresponding to the antenna ports in the corresponding antenna port set.

In one embodiment, the first-type channel quality is in linear correlation with the corresponding second-type channel quality.

In one subembodiment, a linear coefficient corresponding to the linear correlation is 1.

In one embodiment, the first-type channel quality is in linear correlation with the corresponding target offset.

In one subembodiment, a linear coefficient corresponding to the linear correlation is 1.

In one embodiment, the first information set belongs to a high-layer signaling.

In one embodiment, the first information set is cell specific.

In one embodiment, the first information set is indicated by a System Information Block (SIB).

In one embodiment, the Resource Unit (RU) in the disclosure occupies the duration of one multicarrier symbol in time domain and the width of one subcarrier spacing in frequency domain.

In one subembodiment, the duration of one multicarrier symbol is the reciprocal value of a subcarrier occupied by the corresponding RU.

In one subembodiment, the multicarrier symbol is one of an Orthogonal Frequency Division Multiplexing (OFDM) symbol, a Single-Carrier Frequency Division Multiple Access (SC-FDMA) symbol, a Filter Bank Multi Carrier (FBMC) symbol, an OFDM symbol including a Cyclic Prefix (CP), and a Discrete Fourier Transform Spreading Orthogonal Frequency Division Multiplexing (DFT-s-OFDM) symbol including a CP.

In one embodiment, any two of the K1 target time-frequency resource sets occupy RUs which are orthogonal.

In one subembodiment, the orthogonal refers that there is no RU that belongs simultaneously to two of the K1 target time-frequency resource sets.

In one embodiment, two of the K1 target time-frequency resource sets occupy RUs which are not completely orthogonal.

In one embodiment, at least one of the K1 target offsets is not equal to 0.

In one embodiment, none of the K1 target offsets is equal to 0.

In one embodiment, the first-type channel quality corresponds to an RSRP of a given target radio signal to the UE.

In one embodiment, the first-type channel quality corresponds to a Received Signal Strength Indicator (RSSI) of a given target radio signal to the UE.

In one subembodiment of the above two embodiments, the first-type channel quality is in unit of dBm.

In one subembodiment of the above two embodiments, the given target radio signal is one of the K1 target radio signals.

In one embodiment, the first-type channel quality corresponds to an RSRQ of a given target radio signal to the UE.

In one subembodiment, the first-type channel quality is in unit of dB.

In one subembodiment, the given target radio signal is one of the K1 target radio signals.

In one embodiment, the K1 antenna port sets correspond to K1 different Beam-IDs respectively.

According to one aspect of the disclosure, the above method includes:

transmitting second information.

Herein, the second information is used for determining K2 antenna port sets; the K2 antenna port sets are a subset of the K1 antenna port sets; the K2 is a positive integer; and the K1 first-type channel qualities are used for determining the K2 antenna port sets.

In one embodiment, the above method is characterized in that: the UE reports information about the selected K2 antenna port sets to the base station, to help the base station determine channels suitable for the K2 antenna port sets transmitted on the K2 antenna port sets for the UE, so as to obtain a better transmission robustness or a higher transmission rate.

In one embodiment, the first-type channel qualities corresponding to the K2 antenna port sets are the best K2 first-type channel qualities among the K1 first-type channel qualities.

In one embodiment, K2 first-type channel qualities corresponding to the K2 antenna port sets are all greater than a given threshold.

In one subembodiment, the given threshold is fixed.

In one subembodiment, the given threshold is configurable.

In one embodiment, the K2 is 1.

In one embodiment, the second information is transmitted over a physical layer signaling.

In one embodiment, the second information is transmitted over a high-layer signaling.

In one embodiment, the second information includes K2 channel quality groups measured on the K2 antenna port sets, and the channel quality group includes at least one of an RSRP, an RSRQ and an RSSI measured on a corresponding antenna port set.

According to one aspect of the disclosure, the above method includes:

receiving third information.

Herein, the third information includes K1 pieces of third sub-information, and the K1 pieces of third sub-information are used for determining the K1 target time-frequency resource sets respectively.

In one embodiment, the above method is characterized in that: the base station transmits the configuration mode of the K1 target time-frequency resource sets to the UE through the third information.

In one embodiment, the target time-frequency resource set occupies a positive integer number of RUs.

In one embodiment, the third sub-information is used for determining at least one among time-domain positions and frequency-domain positions of RUs occupied by a corresponding target time-frequency resource set.

In one embodiment, the third information belongs to the first information set.

In one embodiment, the third information is a high-layer signaling.

In one embodiment, the third information is cell specific.

In one embodiment, the third information is TRP specific.

In one embodiment, the third information is system broadcast information.

According to one aspect of the disclosure, the above method includes:

receiving fourth information.

Herein, the fourth information is used for determining a shared offset, the shared offset is in unit of decibel, and the shared offset is used for determining the K1 first-type channel qualities.

In one embodiment, the above method is characterized in that: the shared offset may be a cell-specific access offset in Release 13 or previous systems, and the shared offset may be used together with the target offsets designed in this paper to further improve spectrum efficiency.

In one embodiment, the first-type channel quality is in linear correlation with the shared offset.

In one subembodiment, a linear coefficient corresponding to the linear correlation is 1.

In one embodiment, the first-type channel quality is equal to a sum of the corresponding second-type channel quality, the corresponding target offset and the shared offset.

In one embodiment, the fourth information is a high-layer signaling.

In one embodiment, the fourth information is a ReportConfigEUTRA IE (Information Element) in 3GPP TS 36.331.

In one embodiment, the fourth information is a MeasObjectEUTRA IE (Information Element) in 3GPP TS 36.331.

In one embodiment, the shared offset includes at least one of OffsetFreq, cellIndividualOffset, csi-RS-IndividualOffset, a3-Offset, a6-Offset, c2-Offset and Hysteresis in 3GPP TS 36.331.

In one subembodiment, the shared offset is determined by at least two of OffsetFreq, cellIndividualOffset, csi-RS-IndividualOffset, a3-Offset, a6-Offset, c2-Offset and Hysteresis jointly.

According to one aspect of the disclosure, the above method is characterized in that: the target offset is related to at least one of an identifier of a corresponding antenna port set and a type of a channel transmitted on the corresponding antenna port set.

In one embodiment, the above method is characterized in that: different target offsets are set in view of the types of channels transmitted by different antenna port sets, and the UE receives different channels on different antenna port sets, thereby improving transmission efficiency and performance.

In one embodiment, the channel type includes at least one of a synchronization signal, a broadcast channel, a common control channel, a UE-specific control channel and a data channel.

In one subembodiment, at least two of the synchronization signal, the broadcast channel and the common control channel correspond to one same target offset.

In one affiliated embodiment of the above subembodiment, the synchronization signal, the broadcast channel and the common control channel are considered as channels requiring relatively high robustness and large coverage; the corresponding antenna port sets adopt transmission modes which correspond to relatively high robustness and relatively low target offsets, so as to guarantee that transmissions of the synchronization signal, the broadcast channel and the common control channel are provided for more UEs.

In one embodiment, the target offset is further related to a coverage area of a channel transmitted on a corresponding antenna port set.

In one embodiment, the target offset is further related to the capability of the UE.

In one subembodiment, the capability of the UE refers to at least one of an encoding/decoding capability, a cache size and a working band width of the UE.

In one embodiment, the target offset is further related to a service type supported by a corresponding target radio signal.

In one subembodiment, the service type includes at least one of eMMB, URLLC and NBIOT.

In one embodiment, the K1 antenna port sets correspond to K1 different antenna port set identifiers respectively.

According to one aspect of the disclosure, the above method includes:

receiving a first signaling.

Herein, the first signaling is used for at least one operation of determining the K2 antenna port sets and triggering transmission of the second information.

In one embodiment, the above method is characterized in that: the base station configures the K2 antenna port sets for the UE according to prior knowledge, and requires the UE to confirm whether to report the second information according to a measurement result, thereby determining current statuses of channels from the K2 antenna port sets to the UE, and thus determining the types of channels subsequently transmitted on the K2 antenna port sets and transmission modes thereof.

In one embodiment, the above method has the following benefits: when the base station determines the transmission modes and transmission channels of the K2 antenna port sets, the base station configures the K2 antenna port sets to the UE, and further confirms through the UE's report whether the UE is suitable to employ the corresponding transmission modes on the K2 antenna port sets or suitable to receive information of the corresponding transmission channels.

In one embodiment, the first signaling employs a transmission mode of beam sweeping.

In one embodiment, the first signaling is transmitted on a physical layer channel.

In one embodiment, the first signaling is determined by a Common Search Space (CSS).

In one subembodiment, the first signaling is transmitted in a CSS.

In one subembodiment, the first signaling is transmitted in a SIB or broadcast channel.

According to one aspect of the disclosure, the above method is characterized in that: the first information set includes K1 pieces of first sub-information, the K1 pieces of first sub-information are used for determining the K1 target offsets respectively, and the K1 pieces of first sub-information are transmitted by the K1 antenna port sets respectively.

In one embodiment, the above method has the following benefits: the first sub-information is transmitted on a corresponding antenna port set only, which saves air interface resources and increases transmission efficiency.

In one embodiment, the first sub-information is one part of a Master Information Block (MIB).

According to one aspect of the disclosure, the above method includes:

receiving K3 downlink radio signals.

Herein, the K3 downlink radio signals are transmitted by K3 antenna port groups respectively; K3 antenna port sets are used for determining the K3 antenna port groups respectively, the K3 antenna port sets belong to the K2 antenna port sets, and the K3 is a positive integer less than or equal to the K2; and the antenna port group includes a positive integer number of antenna ports.

In one embodiment, the above method has the following benefits: the base station selects the K3 antenna port groups among the K2 antenna port sets reported by the UE, and transmits the K3 downlink radio signals on the K3 antenna port groups respectively; this approach obtains greatest antenna gains while ensuring the flexibility of scheduling of the base station, thus increases spectrum efficiency.

In one embodiment, an antenna virtualization vector associated with the antenna port set is used for generating an antenna virtualization vector associated with the corresponding antenna port group.

In one embodiment, antenna ports included in a given antenna port group belong antenna ports included in a given antenna port set, or antenna ports included in a given antenna port group are equal to antenna ports included in a given antenna port set. The given antenna port group is any one of the K3 antenna port groups, and the given antenna port set is used for determining the given antenna port group.

In one embodiment, the K3 antenna port groups are one-to-one corresponding to the K3 antenna port sets.

The disclosure provides a method in a base station for wireless communication, wherein the method includes:

transmitting a first information set, the first information set including K1 target offsets; and transmitting K1 target radio signals in K1 target time-frequency resource sets respectively.

Herein, the K1 target radio signals are transmitted by K1 antenna port sets respectively; measurements for the K1 target radio signals are used for determining K1 second-type channel qualities respectively; any target offset of the K1 target offsets is in unit of decibel; the K1 is a positive integer greater than 1; the K1 second-type channel qualities are one-to-one corresponding to the K1 target offsets; one second-type channel quality and one corresponding target offset are used for determining one first-type channel quality; the antenna port set includes a positive integer number of antenna ports; the K1 antenna port sets are QCLed, or the K1 target radio signals are associated with the same cell identifier; and the K1 first-type channel qualities are one-to-one corresponding to the K1 antenna port sets.

According to one aspect of the disclosure, the above method includes:

receiving second information.

Herein, the second information is used for determining K2 antenna port sets; the K2 antenna port sets are a subset of the K1 antenna port sets; the K2 is a positive integer; and the K1 first-type channel qualities are used for determining the K2 antenna port sets.

According to one aspect of the disclosure, the above method includes:

transmitting third information.

Herein, the third information includes K1 pieces of third sub-information, and the K1 pieces of third sub-information are used for determining the K1 target time-frequency resource sets respectively.

According to one aspect of the disclosure, the above method includes:

transmitting fourth information.

Herein, the fourth information is used for determining a shared offset, the shared offset is in unit of decibel, and the shared offset is used for determining the K1 first-type channel qualities.

According to one aspect of the disclosure, the above method is characterized in that: the target offset is related to at least one of an identifier of a corresponding antenna port set and a type of a channel transmitted on the corresponding antenna port set.

According to one aspect of the disclosure, the above method includes:

transmitting a first signaling.

Herein, the first signaling is used for at least one operation of determining the K2 antenna port sets and triggering transmission of the second information.

According to one aspect of the disclosure, the above method is characterized in that: the first information set includes K1 pieces of first sub-information, the K1 pieces of first sub-information are used for determining the K1 target offsets respectively, and the K1 pieces of first sub-information are transmitted by the K1 antenna port sets respectively.

According to one aspect of the disclosure, the above method includes:

transmitting K3 downlink radio signals.

Herein, the K3 downlink radio signals are transmitted by K3 antenna port groups respectively; K3 antenna port sets are used for determining the K3 antenna port groups respectively, the K3 antenna port sets belong to the K2 antenna port sets, and the K3 is a positive integer less than or equal to the K2; and the antenna port group includes a positive integer number of antenna ports.

The disclosure provides a UE for wireless communication, wherein the UE includes:

a first receiver, to receive a first information set, the first information set includes K1 target offsets;

a second receiver, to receive K1 target radio signals in K1 target time-frequency resource sets respectively; and a first transceiver, to determine K1 first-type channel qualities.

Herein, the K1 target radio signals are transmitted by K1 antenna port sets respectively; measurements for the K1 target radio signals are used for determining K1 second-type channel qualities respectively; any target offset of the K1 target offsets is in unit of decibel; the K1 is a positive integer greater than 1; the K1 second-type channel qualities are one-to-one corresponding to the K1 target offsets; one second-type channel quality and one corresponding target offset are used for determining one first-type channel quality; the antenna port set includes a positive integer number of antenna ports; the K1 antenna port sets are QCLed, or the K1 target radio signals are associated with the same cell identifier; and the K1 first-type channel qualities are one-to-one corresponding to the K1 antenna port sets.

In one embodiment, the above UE for wireless communication is characterized in that: the first receiver further receives third information. The third information includes K1 pieces of third sub-information, and the K1 pieces of third sub-information are used for determining the K1 target time-frequency resource sets respectively.

In one embodiment, the above UE for wireless communication is characterized in that: the first receivers further receives fourth information. The fourth information is used for determining a shared offset; the shared offset is in unit of decibel, and the shared offset is used for determining the K1 first-type channel qualities.

In one embodiment, the above UE for wireless communication is characterized in that: the first transceiver further receives a first signaling. The first signaling is used for at least one operation of determining the K2 antenna port sets and triggering transmission of the second information.

In one embodiment, the above UE for wireless communication is characterized in that: the first transceiver further transmits second information. The second information is used for determining K2 antenna port sets. The K2 antenna port sets are a subset of the K1 antenna port sets. The K2 is a positive integer. The K1 first-type channel qualities are used for determining the K2 antenna port sets.

In one embodiment, the above UE for wireless communication is characterized in that: the first transceiver further receives K3 downlink radio signals. The K3 downlink radio signals are transmitted by K3 antenna port groups respectively. K3 antenna port sets are used for determining the K3 antenna port groups respectively, the K3 antenna port sets belong to the K2 antenna port sets, and the K3 is a positive integer less than or equal to the K2. The antenna port group includes a positive integer number of antenna ports.

In one embodiment, the above UE for wireless communication is characterized in that: the target offset is related to at least one of an identifier of a corresponding antenna port set and a type of a channel transmitted on the corresponding antenna port set.

In one embodiment, the above UE for wireless communication is characterized in that: the first information set includes K1 pieces of first sub-information, the K1 pieces of first sub-information are used for determining the K1 target offsets respectively, and the K1 pieces of first sub-information are transmitted by the K1 antenna port sets respectively.

The disclosure provides a base station for wireless communication, wherein the base station includes:

a first transmitter, to transmit a first information set, the first information set including K1 target offsets; and a second transmitter, to transmit K1 target radio signals in K1 target time-frequency resource sets respectively; and a second transceiver, to receive second information.

Herein, the K1 target radio signals are transmitted by K1 antenna port sets respectively; measurements for the K1 target radio signals are used for determining K1 second-type channel qualities respectively; any target offset of the K1 target offsets is in unit of decibel; the K1 is a positive integer greater than 1; the K1 second-type channel qualities are one-to-one corresponding to the K1 target offsets; one second-type channel quality and one corresponding target offset are used for determining one first-type channel quality; the antenna port set includes a positive integer number of antenna ports; the K1 antenna port sets are QCLed, or the K1 target radio signals are associated with the same cell identifier; the K1 first-type channel qualities are one-to-one corresponding to the K1 antenna port sets; the second information is used for determining K2 antenna port sets; the K2 antenna port sets are a subset of the K1 antenna port sets; the K2 is a positive integer; and the K1 first-type channel qualities are used for determining the K2 antenna port sets.

In one embodiment, the base station for wireless communication is characterized in that: the first transmitter further transmits third information. The third information includes K1 pieces of third sub-information, and the K1 pieces of third sub-information are used for determining the K1 target time-frequency resource sets respectively.

In one embodiment, the base station for wireless communication is characterized in that: the first transmitter further transmits fourth information. The fourth information is used for determining a shared offset, the shared offset is in unit of decibel, and the shared offset is used for determining the K1 first-type channel qualities.

In one embodiment, the base station for wireless communication is characterized in that: the second transceiver further transmits a first signaling. The first signaling is used for at least one operation of determining the K2 antenna port sets and triggering transmission of the second information.

In one embodiment, the base station for wireless communication is characterized in that: the second transceiver further transmits K3 downlink radio signals. The K3 downlink radio signals are transmitted by K3 antenna port groups respectively. K3 antenna port sets are used for determining the K3 antenna port groups respectively, the K3 antenna port sets belong to the K2 antenna port sets, and the K3 is a positive integer less than or equal to the K2. The antenna port group includes a positive integer number of antenna ports.

In one embodiment, the base station for wireless communication is characterized in that: the target offset is related to at least one of an identifier of a corresponding antenna port set and a type of a channel transmitted on the corresponding antenna port set.

In one embodiment, the base station for wireless communication is characterized in that: the first information set includes K1 pieces of first sub-information, and the K1 pieces of first sub-information are used for determining the K1 target offsets respectively. The K1 pieces of first sub-information are transmitted by the K1 antenna port sets respectively.

Compared with the prior art, the disclosure has the following technical advantages.

Different target offsets are designed for different antenna port sets under one same base station or TRP. When channels with different robustness requirements and different coverage requirements are transmitted on different antenna port sets, spatial resources and base station coverage can be optimized, thus spectrum utilization can be improved.

By flexibly configuring antenna ports included in antenna port sets and corresponding target offsets, the method designed in this paper is more flexible to implement.

Through the combined use of the target offsets and the shared offset, the UE can access different cells and antenna port sets according to the transmissions of different channels. Coverage is increased and access is optimized.

Through the design of the first signaling, the base station can indicate the UE to report the second information. It is not needed to reserve resources to periodically report the second information. Overheads of uplink resources are saved.

BRIEF DESCRIPTION OF THE DRAWINGS

Other features, purposes and advantages of the disclosure will become more apparent from the detailed description of non-restrictive embodiments taken in conjunction with the following drawings.

DESCRIPTION OF THE EMBODIMENTS

The technical scheme of the disclosure is described below in further detail in conjunction with the drawings. It should be noted that the embodiments in the disclosure and the characteristics of the embodiments may be arbitrarily combined if no conflict is incurred.

Embodiment 1

Figure 1:
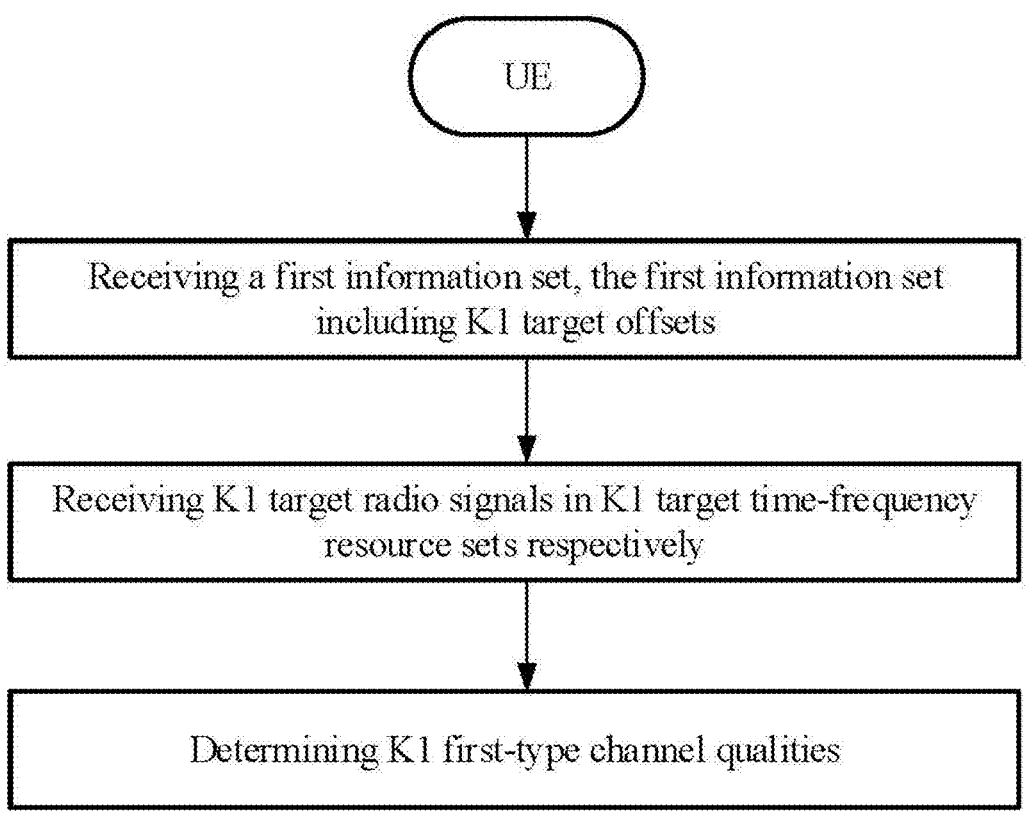
FIG. 1 is a flowchart of a first information set according to one embodiment of the disclosure.

Embodiment 1 illustrates an example of a flowchart of a first information set, as shown in FIG. 1.

In Embodiment 1, the UE in the disclosure first receives a first information set, the first information set including K1 target offsets; next, the UE receives K1 target radio signals in K1 target time-frequency resource sets respectively; and then, the UE determines K1 first-type channel qualities; wherein the K1 target radio signals are transmitted by K1 antenna port sets respectively; measurements for the K1 target radio signals are used for determining K1 second-type channel qualities respectively; any target offset of the K1 target offsets is in unit of decibel; the K1 is a positive integer greater than 1; the K1 second-type channel qualities are one-to-one corresponding to the K1 target offsets; one second-type channel quality and one corresponding target offset are used for determining one first-type channel quality; the antenna port set includes a positive integer number of antenna ports; the K1 antenna port sets are QCLed, or the K1 target radio signals are associated with the same cell identifier; and the K1 first-type channel qualities are one-to-one corresponding to the K1 antenna port sets.

In one subembodiment, the target radio signal includes at least one of a target signature sequence and a target reference signal.

In one subembodiment, the cell identifier is a PCID.

In one subembodiment, the QCLed refers to Quasi Co-Located.

In one subembodiment, the first-type channel quality is in linear correlation with the corresponding target offset.

In one affiliated embodiment of the above subembodiment, a linear coefficient corresponding to the linear correlation is 1.

Embodiment 2

Figure 2:
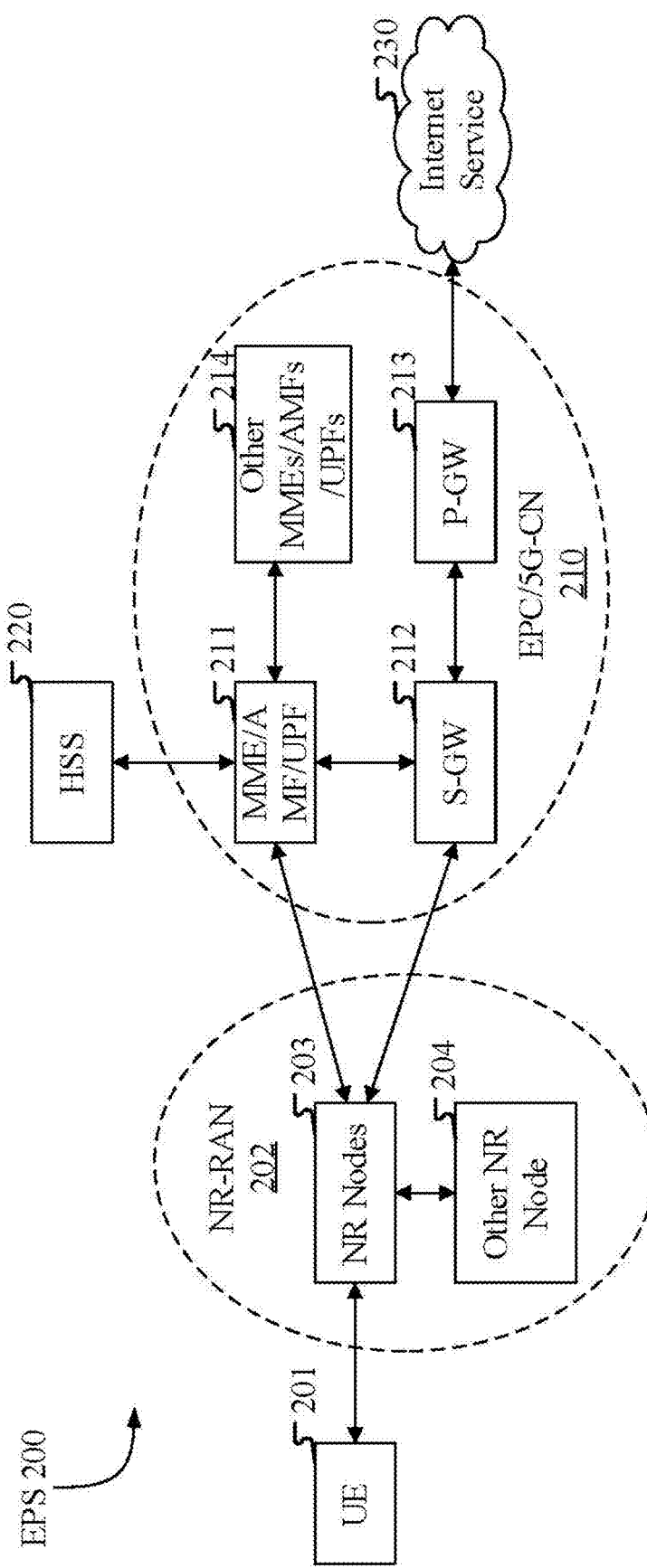
FIG. 2 is a diagram illustrating a network architecture according to one embodiment of the disclosure.

Embodiment 2 illustrates an example of a diagram of a network architecture, as shown in FIG. 2.

Embodiment 2 illustrates an example of a diagram of a network architecture according to the disclosure, as shown in FIG. 2. FIG. 2 is a diagram illustrating a network architecture 200 of NR LTE and Long-Term Evolution Advanced (LTE-A) systems. The NR 5G or LTE network architecture 200 may be called an Evolved Packet System (EPS) 200 or some other appropriate terms. The EPS 200 may include one or more UEs 201, a Next Generation-Radio Access Network (NG-RAN) 202, an Evolved Packet Core/5G-Core Network (EPC/5G-CN) 210, a Home Subscriber Server (HSS) 220 and an Internet service 230. The EPS may be interconnected with other access networks. For simple description, the entities/interfaces are not shown. As shown in FIG. 2, the EPS provides packet switching services. Those skilled in the art are easy to understand that various concepts presented throughout the disclosure can be extended to networks providing circuit switching services or other cellular networks. The NG-RAN includes an NR node B (gNB) 203 and other gNBs 204. The gNB 203 provides UE 201 oriented user plane and control plane protocol terminations. The gNB 203 is connected to other gNBs 204 via an Xn interface (for example, backhaul). The gNB 203 and the gNB 204 may also be called base stations, base transceiver stations, radio base stations, radio transceivers, transceiver functions, Basic Service Sets (BSSs), Extended Service Sets (ESSs), TRPs or some other appropriate terms. The gNB 203 provides an access point of the EPC/5G-CN 210 for the UE 201. Examples of UE 201 include cellular phones, smart phones, Session Initiation Protocol (SIP) phones, laptop computers, Personal Digital Assistants (PDAs), Satellite Radios, non-territorial network base station communications, satellite mobile communications, Global Positioning Systems (GPSs), multimedia devices, video devices, digital audio players (for example, MP3 players), cameras, games consoles, unmanned aerial vehicles, air vehicles, narrowband physical network equipment, machine-type communication equipment, land vehicles, automobiles, wearable equipment, or any other devices having similar functions. Those skilled in the art may also call the UE 201 a mobile station, a subscriber station, a mobile unit, a subscriber unit, a wireless unit, a remote unit, a mobile device, a wireless device, a radio communication device, a remote device, a mobile subscriber station, an access terminal, a mobile terminal, a wireless terminal, a remote terminal, a handset, a user proxy, a mobile client, a client or some other appropriate terms. The gNB 203 is connected to the EPC/5G-CN 210 via an S1/NG interface. The EPC/5G-CN 210 includes a Mobility Management Entity/Authentication Management Field/User Plane Function (MME/AMF/UPF) 211, other MMEs/AMFs/UPFs 214, a Service Gateway (S-GW) 212 and a Packet Data Network Gateway (P-GW) 213. The MME/AMF/UPF 211 is a control node for processing signalings between the UE 201 and the EPC/5G-CN 210. Generally, the MME/AMF/UPF 211 provides bearer and connection management. All user Internet Protocol (IP)

packets are transmitted through the S-GW 212. The S-GW 212 is connected to the P-GW 213. The P-GW 213 provides UE IP address allocation and other functions. The P-GW 213 is connected to the Internet service 230. The Internet service 230 includes IP services corresponding to operators, specifically including internet, intranet, IP Multimedia Subsystems (IP IMSs) and PS Streaming Services (PSSs).

In one subembodiment, the UE 201 corresponds to the UE in the disclosure.

In one subembodiment, the gNB 203 corresponds to the base station in the disclosure.

In one subembodiment, the UE 201 supports BF based transmissions.

In one subembodiment, the gNB 203 supports BF based transmissions.

Embodiment 3

Figure 3:
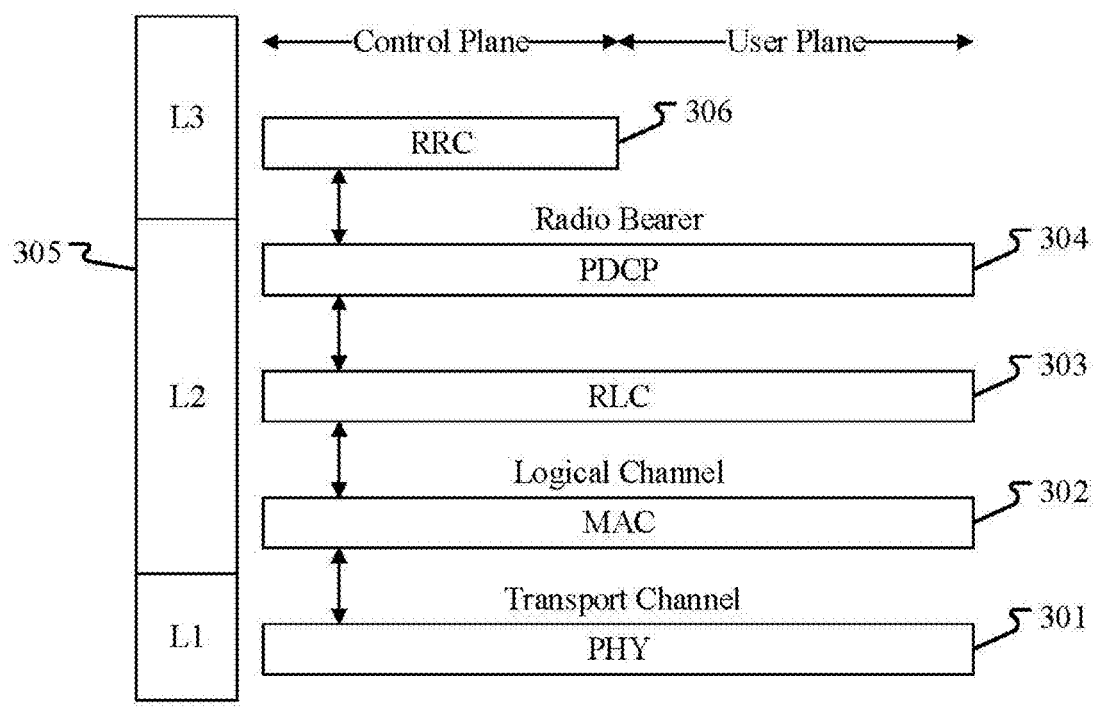
FIG. 3 is a diagram illustrating an embodiment of a radio protocol architecture of a user plane and a control plane according to one embodiment of the disclosure.

Embodiment 3 is a diagram illustrating an embodiment of a radio protocol architecture of a user plane and a control plane according to the disclosure, as shown in FIG. 3.

FIG. 3 is a diagram illustrating an embodiment of a radio protocol architecture of a user plane and a control plane. In FIG. 3, the radio protocol architecture of a UE and a base station (gNB or eNB) is represented by three layers, which are a Layer 1, a Layer 2 and a Layer 3 respectively. The Layer 1 (L1 layer) 301 is the lowest layer and implements various PHY (physical layer) signal processing functions. The L1 layer will be referred to herein as the PHY 301. The Layer 2 (L2 layer) 305 is above the PHY 301, and is responsible for the link between the UE and the gNB over the PHY 301. In the user plane, the L2 layer 305 includes a Medium Access Control (MAC) sublayer 302, a Radio Link Control (RLC) sublayer 303, and a Packet Data Convergence Protocol (PDCP) sublayer 304, which are terminated at the gNB on the network side. Although not shown in FIG. 3, the UE may include several higher layers above the L2 layer 305, including a network layer (i.e. IP layer) terminated at the P-GW on the network side and an application layer terminated at the other end (i.e. a peer UE, a server, etc.) of the connection. The PDCP sublayer 304 provides multiplexing between different radio bearers and logical channels. The PDCP sublayer 304 also provides header compression for higher-layer packets so as to reduce radio transmission overheads. The PDCP sublayer 304 provides security by encrypting packets and provides support for UE handover between gNBs. The RLC sublayer 303 provides segmentation and reassembling of higher-layer packets, retransmission of lost packets, and reordering of lost packets to as to compensate for out-of-order reception due to HARQ. The MAC sublayer 302 provides multiplexing between logical channels and transport channels. The MAC sublayer 302 is also responsible for allocating various radio resources (i.e., resource blocks) in one cell among UEs. The MAC sublayer 302 is also in charge of HARQ operations. In the control plane, the radio protocol architecture of the UE and the gNB is almost the same as the radio protocol architecture in the user plane on the PHY 301 and the L2 layer 305, with the exception that there is no header compression function for the control plane. The control plane also includes a Radio Resource Control (RRC) sublayer 306 in the layer 3 (L3). The RRC sublayer 306 is responsible for acquiring radio resources (i.e. radio bearers) and configuring lower layers using an RRC signaling between the gNB and the UE.

In one subembodiment, the radio protocol architecture shown in FIG. 3 is applicable to the UE in the disclosure.

In one subembodiment, the radio protocol architecture shown in FIG. 3 is applicable to the network equipment in the disclosure.

In one subembodiment, the first information set in the disclosure is generated by the RRC sublayer 306.

In one subembodiment, the second information in the disclosure is generated by the RRC sublayer 306.

In one subembodiment, the second information in the disclosure is generated by the PHY 301.

In one subembodiment, the third information in the disclosure is generated by the RRC sublayer 306.

In one subembodiment, the fourth information in the disclosure is generated by the RRC sublayer 306.

Embodiment 4

Figure 4:
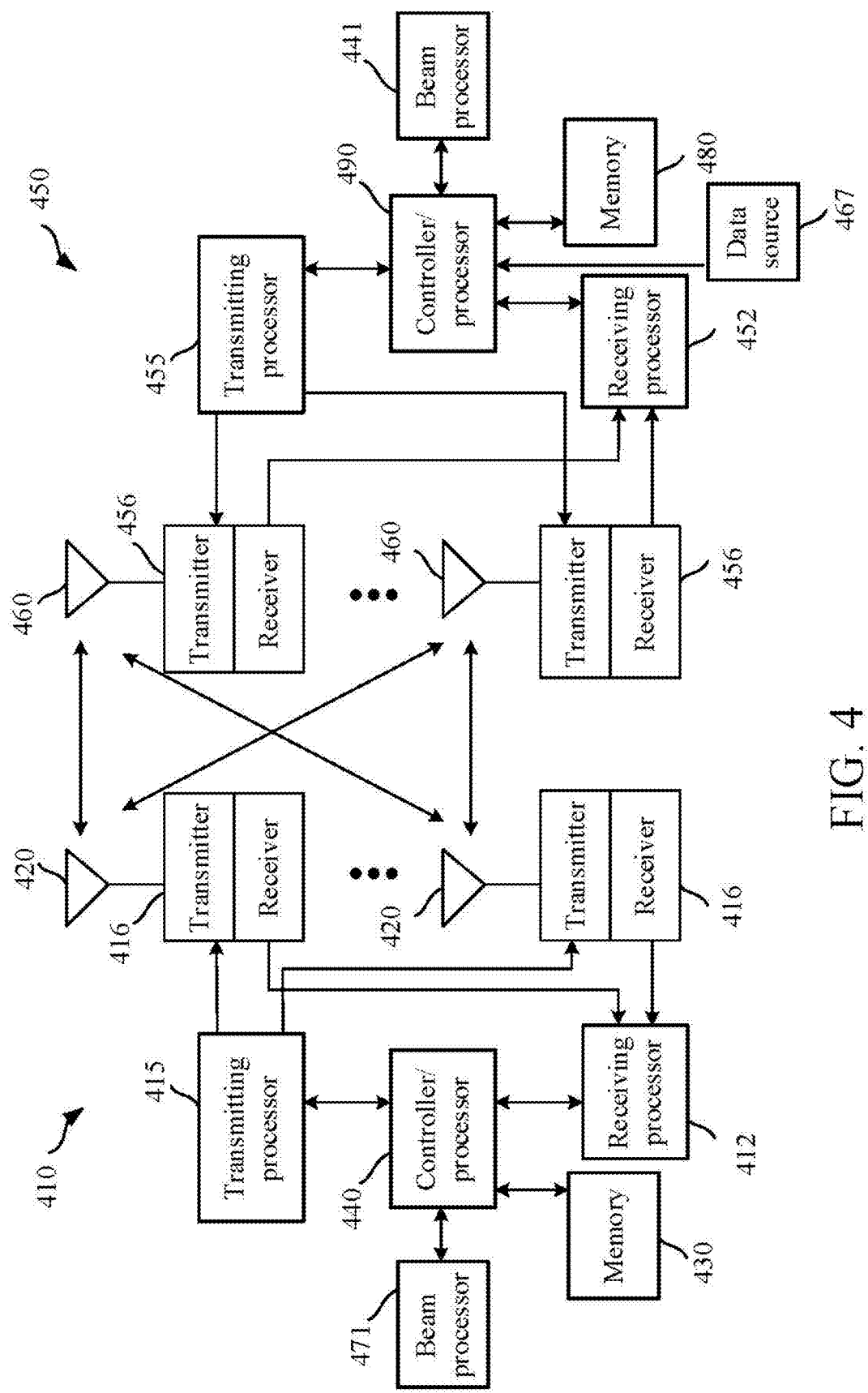
FIG. 4 is a diagram illustrating an evolved node B and a UE according to one embodiment of the disclosure.

Embodiment 4 illustrates a diagram of an evolved node B and a UE according to the disclosure, as shown in FIG. 4. The base station in the disclosure corresponds to the evolved node B. FIG. 4 is a block diagram of a gNB 410 in communication with a UE 450 in an access network.

The base station 410 includes a controller/processor 440, a memory 430, a receiving processor 412, a transmitting processor 415, a beam processor 471, a transmitter/receiver 416 and an antenna 420.

The UE 450 includes a controller/processor 490, a memory 480, a data source 467, a transmitting processor 455, a receiving processor 452, a beam processor 441, a transmitter/receiver 456 and an antenna 460.

In Downlink (DL) transmission, processes relevant to the base station 410 include the following.

A higher-layer packet is provided to the controller/processor 440. The controller/processor 440 provides header compression, encryption, packet segmentation and reordering, multiplexing and de-multiplexing between a logical channel and a transport channel, to implement L2 protocols used for the user plane and the control plane. The higher-layer packet may include data or control information, for example, Downlink Shared Channel (DL-SCH).

The controller/processor 440 is connected to the memory 430 that stores program codes and data. The memory 430 may be a computer readable medium.

The controller/processor 440 includes a scheduling unit used for transmission requirements. The scheduling unit is configured to schedule air-interface resources corresponding to transmission requirements.

The beam processor 471 determines a first information set and determines second information, and sends the results to the controller/processor 440.

The transmitting processor 415 receives a bit stream output from the controller/processor 440, and performs various signal transmitting processing functions used for L1 layer (that is, PHY), including encoding, interleaving, scrambling, modulation, power control/allocation, generation of physical layer control signalings (including PBCH, PDCCH, PHICH, PCFICH, reference signal), etc.

The transmitter 416 is configured to convert the baseband signal provided by the transmitting processor 415 into a radio-frequency signal and transmit the radio-frequency signal via the antenna 420. Each transmitter 416 performs sampling processing on respective input symbol streams to obtain respective sampled signal streams. Each transmitter 416 performs further processing (for example, digital-to-analogue conversion, amplification, filtering, up conversion, etc.) on respective sampled streams to obtain a downlink signal.

In DL transmission, processes relevant to the UE 450 include the following.

The receiver 456 is configured to convert a radio-frequency signal received via the antenna 460 into a baseband signal and provide the baseband signal to the receiving processor 452.

The receiving processor 452 performs various signal receiving processing functions used for L1 layer (that is, PHY), including decoding, de-interleaving, descrambling, demodulation, extraction of physical layer control signalings, etc.

The beam processor 441 determines a first information set and determines K1 first-type channel qualities, and sends the results to the controller/processor 490.

The controller/processor 490 receives a bit stream output from the receiving processor 452, and provides header decompression, decryption, packet segmentation and reordering, multiplexing and de-multiplexing between a logical channel and a transport channel, to implement L2 protocols used for the user plane and the control plane.

The controller/processor 490 is connected to the memory 480 that stores program codes and data. The memory 480 may be a computer readable medium.

In one subembodiment, the UE 450 device includes at least one processor and at least one memory. The at least one memory includes computer program codes. The at least one memory and the computer program codes are configured to be used in collaboration with the at least one processor. The UE 450 device at least: receives a first information set, the first information set including K1 target offsets; receives K1 target radio signals in K1 target time-frequency resource sets respectively; and determines K1 first-type channel qualities; wherein the K1 target radio signals are transmitted by K1 antenna port sets respectively; measurements for the K1 target radio signals are used for determining K1 second-type channel qualities respectively; any target offset of the K1 target offsets is in unit of decibel; the K1 is a positive integer greater than 1; the K1 second-type channel qualities are one-to-one corresponding to the K1 target offsets; one second-type channel quality and one corresponding target offset are used for determining one first-type channel quality; the antenna port set includes a positive integer number of antenna ports; the K1 antenna port sets are QCLed, or the K1 target radio signals are associated with the same cell identifier; and the K1 first-type channel qualities are one-to-one corresponding to the K1 antenna port sets.

In one subembodiment, the UE 450 includes a memory that stores a computer readable instruction program. The computer readable instruction program generates an action when executed by at least one processor. The action includes: receiving a first information set, the first information set including K1 target offsets; receiving K1 target radio signals in K1 target time-frequency resource sets respectively; and determining K1 first-type channel qualities; wherein the K1 target radio signals are transmitted by K1 antenna port sets respectively; measurements for the K1 target radio signals are used for determining K1 second-type channel qualities respectively; any target offset of the K1 target offsets is in unit of decibel; the K1 is a positive integer greater than 1; the K1 second-type channel qualities are one-to-one corresponding to the K1 target offsets; one second-type channel quality and one corresponding target offset are used for determining one first-type channel quality; the antenna port set includes a positive integer number of antenna ports; the K1 antenna port sets are QCLed, or the K1 target radio signals are associated with the same cell identifier; and the K1 first-type channel qualities are one-to-one corresponding to the K1 antenna port sets.

In one subembodiment, the gNB 410 includes at least one processor and at least one memory. The at least one memory includes computer program codes. The at least one memory and the computer program codes are configured to be used in collaboration with the at least one processor. The gNB 410 at least: transmits a first information set, the first information set including K1 target offsets; and transmits K1 target radio signals in K1 target time-frequency resource sets respectively; wherein the K1 target radio signals are transmitted by K1 antenna port sets respectively; measurements for the K1 target radio signals are used for determining K1 second-type channel qualities respectively; any target offset of the K1 target offsets is in unit of decibel; the K1 is a positive integer greater than 1; the K1 second-type channel qualities are one-to-one corresponding to the K1 target offsets; one second-type channel quality and one corresponding target offset are used for determining one first-type channel quality; the antenna port set includes a positive integer number of antenna ports; the K1 antenna port sets are QCLed, or the K1 target radio signals are associated with the same cell identifier; and the K1 first-type channel qualities are one-to-one corresponding to the K1 antenna port sets.

In one subembodiment, the gNB 410 includes a memory that stores a computer readable instruction program. The computer readable instruction program generates an action when executed by at least one processor. The action includes: transmitting a first information set, the first information set including K1 target offsets; and transmitting K1 target radio signals in K1 target time-frequency resource sets respectively; wherein the K1 target radio signals are transmitted by K1 antenna port sets respectively; measurements for the K1 target radio signals are used for determining K1 second-type channel qualities respectively; any target offset of the K1 target offsets is in unit of decibel; the K1 is a positive integer greater than 1; the K1 second-type channel qualities are one-to-one corresponding to the K1 target offsets; one second-type channel quality and one corresponding target offset are used for determining one first-type channel quality; the antenna port set includes a positive integer number of antenna ports; the K1 antenna port sets are QCLed, or the K1 target radio signals are associated with the same cell identifier; and the K1 first-type channel qualities are one-to-one corresponding to the K1 antenna port sets.

In one subembodiment, the UE 450 corresponds to the UE in the disclosure.

In one subembodiment, the gNB 410 corresponds to the base station in the disclosure.

In one subembodiment, at least the former two of the receiver 456, the receiving processor 452 and the controller/processor 490 are used for receiving at least a first information set among the first information set, third information, fourth information, a first signaling and K3 downlink radio signals; the first information set includes K1 target offsets.

In one subembodiment, at least one of the beam processor 441 and the controller/processor 490 is used for determining at least one of a first information set and K1 first-type channel qualities.

In one subembodiment, at least one of the beam processor 441 and the controller/processor 490 is used for determining second information.

In one subembodiment, at least the former two of the receiver 456, the receiving processor 452 and the controller/processor 490 are used for receiving K1 target radio signals in K1 target time-frequency resource sets respectively.

In one subembodiment, at least the former two of the transmitter 456, the transmitting processor 455 and the controller/processor 490 are used for transmitting second information.

In one subembodiment, at least the former two of the transmitter 416, the transmitting processor 415 and the controller/processor 440 are used for transmitting at least a first information set among the first information set, third information, fourth information, a first signaling and K3 downlink radio signals; the first information set includes K1 target offsets.

In one subembodiment, at least one of the beam processor 471 and the controller/processor 440 is used for determining a first information set.

In one subembodiment, at least one of the beam processor 471 and the controller/processor 440 is used for determining second information.

In one subembodiment, at least the former two of the transmitter 416, the transmitting processor 415 and the controller/processor 440 are used for transmitting K1 target radio signals in K1 target time-frequency resource sets respectively.

In one subembodiment, at least the former two of the receiver 416, the receiving processor 412 and the controller/processor 440 are used for receiving second information.

Embodiment 5

Figure 5:
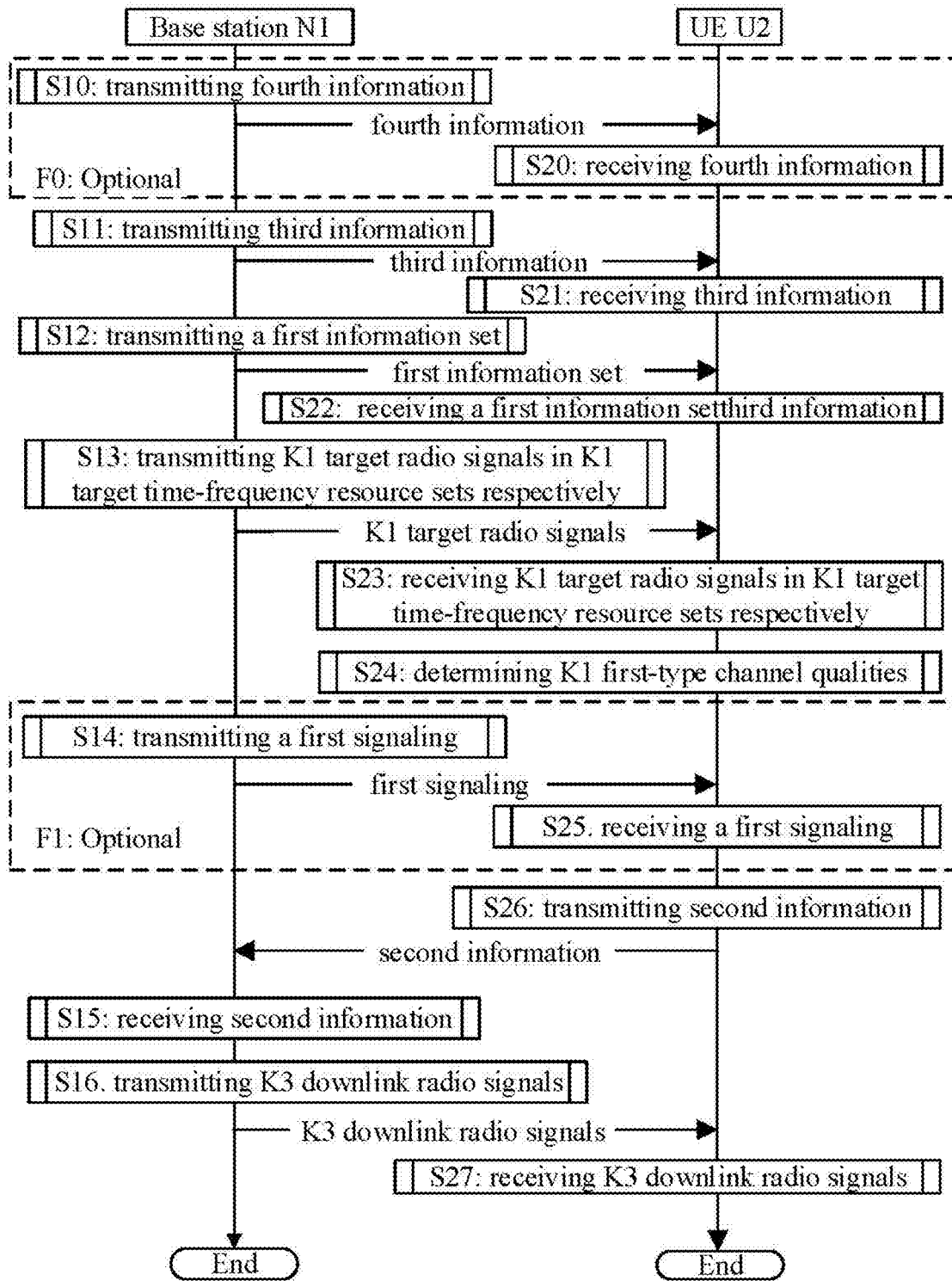
FIG. 5 is a flowchart illustrating the transmission of a first information set according to one embodiment of the disclosure.

Embodiment 5 illustrates an example of a flowchart of the transmission of a first information set according to the disclosure, as shown in FIG. 5. In FIG. 5, a base station N1 is a maintenance base station for a serving cell of a UE U2. Steps in boxes F0 and F1 are optional.

The base station N1 transmits fourth information in S10, transmits third information in S11, transmits a first information set in S12, transmits K1 target radio signals in K1 target time-frequency resource sets respectively in S13, transmits a first signaling in S14, receives second information in S15, and transmits K3 downlink radio signals in S16.

The UE U2 receives fourth information in S20, receives third information in S21, receives a first information set in S22, receives K1 target radio signals in K1 target time-frequency resource sets respectively in S23, determines K1 first-type channel qualities in S24, receives a first signaling in S25, transmits second information in S26, and receives K3 downlink radio signals in S27.

In Embodiment 5, the K1 target radio signals are transmitted by K1 antenna port sets respectively; measurements for the K1 target radio signals are used for determining K1 second-type channel qualities respectively; any target offset of the K1 target offsets is in unit of decibel; the K1 is a positive integer greater than 1; the K1 second-type channel qualities are one-to-one corresponding to the K1 target offsets; one second-type channel quality and one corresponding target offset are used for determining one first-type channel quality; the antenna port set includes a positive integer number of antenna ports; the K1 antenna port sets are QCLed, or the K1 target radio signals are associated with the same cell identifier; the K1 first-type channel qualities are one-to-one corresponding to the K1 antenna port sets; the second information is used for determining K2 antenna port sets; the K2 antenna port sets are a subset of the K1 antenna port sets; the K2 is a positive integer; and the K1 first-type channel qualities are used for determining the K2 antenna port sets; the third information includes K1 pieces of third sub-information, and the K1 pieces of third sub-information are used for determining the K1 target time-frequency resource sets respectively; the fourth information is used for determining a shared offset, the shared offset is in unit of decibel, and the shared offset is used for determining the K1 first-type channel qualities; the target offset is related to at least one of {an identifier of a corresponding antenna port set, a type of a channel transmitted on the corresponding antenna port set}; the first signaling is used for at least one operation of {determining the K2 antenna port sets, triggering transmission of the second information}; the first information set includes K1 pieces of first sub-information, the K1 pieces of first sub-information are used for determining the K1 target offsets respectively, and the K1 pieces of first sub-information are transmitted by the K1 antenna port sets respectively; the K3 downlink radio signals are transmitted by K3 antenna port groups respectively; K3 antenna port sets are used for determining the K3 antenna port groups respectively, the K3 antenna port sets belong to the K2 antenna port sets, and the K3 is a positive integer less than or equal to the K2; and the antenna port group includes a positive integer number of antenna ports.

In one subembodiment, the fourth information is a cell-specific RRC signaling.

In one subembodiment, the fourth information is a TRP-specific RRC signaling.

In one subembodiment, the third information is a cell-specific RRC signaling.

In one subembodiment, the third information is a TRP-specific RRC signaling.

In one subembodiment, the first information set is a cell-specific RRC signaling.

In one subembodiment, the first information set is a TRP-specific RRC signaling.

In one subembodiment, the first signaling is a physical layer signaling.

In one subembodiment, the downlink radio signal includes a Physical Downlink Shared Channel (PDSCH) or a Short Latency Physical Downlink Shared Channel (sPDSCH).

In one subembodiment, a transmission channel corresponding to the downlink radio signal is a Downlink Shared Channel (DL-SCH).

In one subembodiment, the downlink radio signal includes a UE-specific physical layer control signaling.

Embodiment 6

Figure 6:
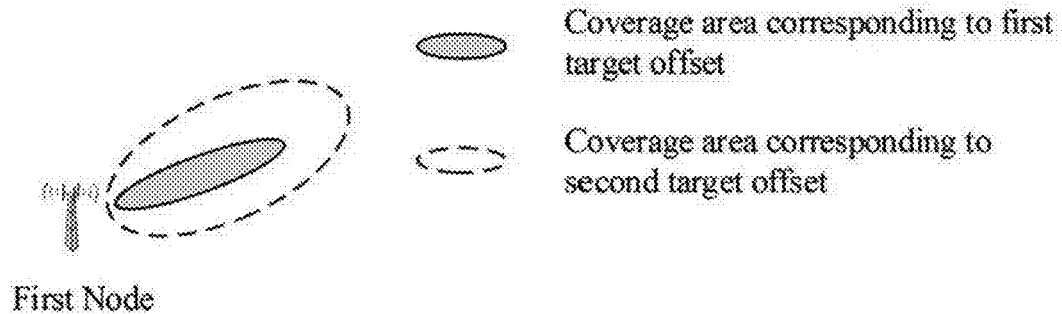
FIG. 6 is a diagram illustrating a coverage area corresponding to a target offset according to one embodiment of the disclosure.

Embodiment 6 illustrates an example of a diagram of a coverage area corresponding to a target offset. As shown in FIG. 6, the first node corresponds to a transmitter of a first information set. The solid-line ellipse corresponds to a coverage area of a first antenna port set, and the dash-line ellipse corresponds to a coverage area of a second antenna port set. The first antenna port set corresponds to a first target offset, and the second antenna port set corresponds to a second target offset. The coverage area of the solid-line ellipse is less than the coverage area of the dash-line ellipse.

In one subembodiment, the first node is a base station.

In one subembodiment, the first node is a cell.

In one subembodiment, the first node is a TRP.

In one subembodiment, the first target offset is less than the second target offset.

In one subembodiment, the first antenna port set is used for transmission of data channels.

In one subembodiment, the second antenna port set is used for transmission of control channels.

In one subembodiment, the first antenna port set is used for transmission of UE-specific channels.

In one subembodiment, the second antenna port set is used for transmission of channels other than UE-specific channels.

Embodiment 7

Figure 7:
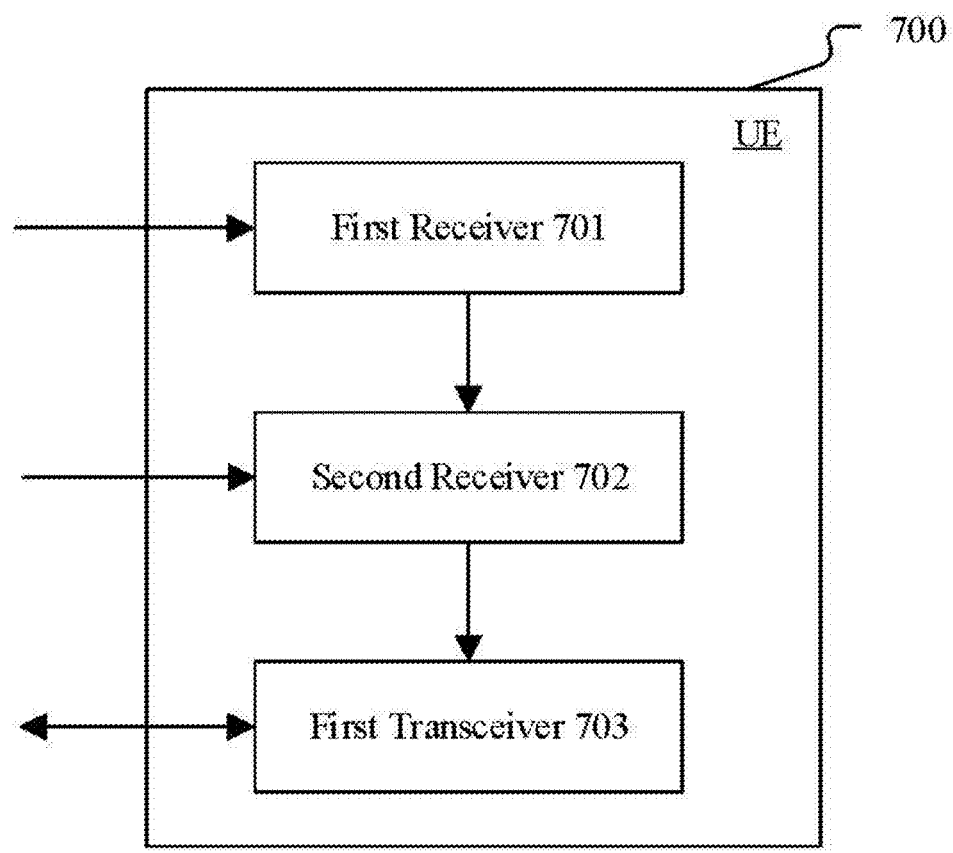
FIG. 7 is a structure block diagram illustrating a processing device in a UE according to one embodiment of the disclosure.

Embodiment 7 illustrates an example of a structure block diagram of a processing device in a UE, as shown in FIG. 7. In FIG. 7, the processing device 700 in the UE includes a first receiver 701, a second receiver 702 and a first transceiver 703.

The first receiver 701 receives a first information set, the first information set including K1 target offsets.

The second receiver 702 receives K1 target radio signals in K1 target time-frequency resource sets respectively.

The first transceiver 703 determines K1 first-type channel qualities.

In Embodiment 7, the K1 target radio signals are transmitted by K1 antenna port sets respectively; measurements for the K1 target radio signals are used for determining K1 second-type channel qualities respectively; any target offset of the K1 target offsets is in unit of decibel; the K1 is a positive integer greater than 1; the K1 second-type channel qualities are one-to-one corresponding to the K1 target offsets; one second-type channel quality and one corresponding target offset are used for determining one first-type channel quality; the antenna port set includes a positive integer number of antenna ports; the K1 antenna port sets are QCLed, or the K1 target radio signals are associated with the same cell identifier; and the K1 first-type channel qualities are one-to-one corresponding to the K1 antenna port sets.

In one embodiment, the first receiver 701 further receives third information, the third information includes K1 pieces of third sub-information, and the K1 pieces of third sub-information are used for determining the K1 target time-frequency resource sets respectively.

In one embodiment, the first receivers 701 further receives fourth information, the fourth information is used for determining a shared offset, the shared offset is in unit of decibel, and the shared offset is used for determining the K1 first-type channel qualities.

In one embodiment, the first transceiver 703 further receives a first signaling, and the first signaling is used for at least one operation of {determining the K2 antenna port sets, triggering transmission of the second information}.

In one embodiment, the first transceiver 703 further transmits second information, the second information is used for determining K2 antenna port sets, the K2 antenna port sets are a subset of the K1 antenna port sets, the K2 is a positive integer, and the K1 first-type channel qualities are used for determining the K2 antenna port sets.

In one embodiment, the first transceiver 703 further receives K3 downlink radio signals, the K3 downlink radio signals are transmitted by K3 antenna port groups respectively, K3 antenna port sets are used for determining the K3 antenna port groups respectively, the K3 antenna port sets belong to the K2 antenna port sets, the K3 is a positive integer less than or equal to the K2, and the antenna port group includes a positive integer number of antenna ports.

In one embodiment, the first receiver 701 includes at least the former three of the receiver, the receiving processor 452, the beam processor 441 and the controller/processor 490 mentioned in Embodiment 4.

In one embodiment, the second receiver 702 includes at least the former three of the receiver, the receiving processor 452 and the controller/processor 490 mentioned in Embodiment 4.

In one embodiment, the first transceiver 703 includes at least the former three of the receiver/transmitter 456, the receiving processor 452, the transmitting processor 455, the beam processor 441 and the controller/processor 490 mentioned in Embodiment 4.

Embodiment 8

Figure 8:
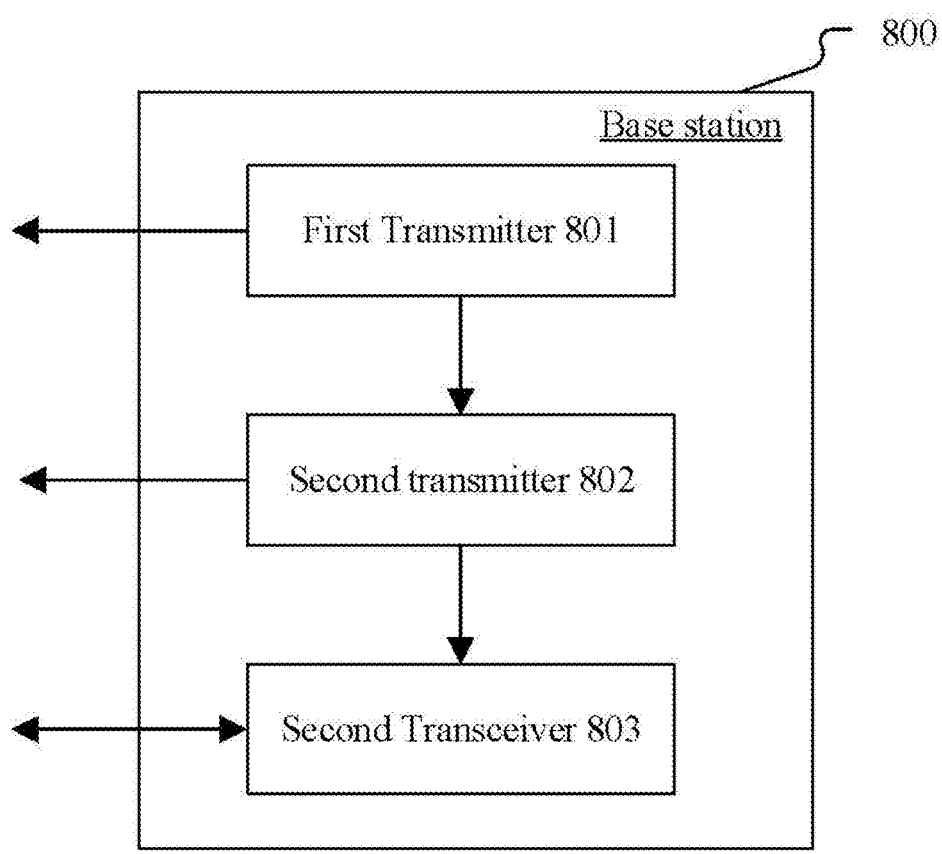
FIG. 8 is a structure block diagram illustrating a processing device in a base station according to one embodiment of the disclosure.

Embodiment 8 illustrates an example of a structure block diagram of a processing device in a base station, as shown in FIG. 8. In FIG. 8, the processing device 800 in the base station includes a first transmitter 801, a second transmitter 802 and a second transceiver 803.

The first transmitter 801 transmits a first information set, the first information set including K1 target offsets.

The second transmitter 802 transmits K1 target radio signals in K1 target time-frequency resource sets respectively.

The second transceiver 803 receives second information.

In Embodiment 8, the K1 target radio signals are transmitted by K1 antenna port sets respectively; measurements for the K1 target radio signals are used for determining K1 second-type channel qualities respectively; any target offset of the K1 target offsets is in unit of decibel; the K1 is a positive integer greater than 1; the K1 second-type channel qualities are one-to-one corresponding to the K1 target offsets; one second-type channel quality and one corresponding target offset are used for determining one first-type channel quality; the antenna port set includes a positive integer number of antenna ports; the K1 antenna port sets are QCLed, or the K1 target radio signals are associated with the same cell identifier; the K1 first-type channel qualities are one-to-one corresponding to the K1 antenna port sets; the second information is used for determining K2 antenna port sets; the K2 antenna port sets are a subset of the K1 antenna port sets; the K2 is a positive integer; and the K1 first-type channel qualities are used for determining the K2 antenna port sets.

In one embodiment, the first transmitter 801 further transmits third information, the third information includes K1 pieces of third sub-information, and the K1 pieces of third sub-information are used for determining the K1 target time-frequency resource sets respectively.

In one embodiment, the first transmitter 801 further transmits fourth information, the fourth information is used for determining a shared offset, the shared offset is in unit of decibel, and the shared offset is used for determining the K1 first-type channel qualities.

In one embodiment, the second transceiver 803 further transmits a first signaling, and the first signaling is used for at least one operation of determining the K2 antenna port sets and triggering transmission of the second information.

In one embodiment, the second transceiver 803 further transmits K3 downlink radio signals; the K3 downlink radio signals are transmitted by K3 antenna port groups respectively; K3 antenna port sets are used for determining the K3 antenna port groups respectively, the K3 antenna port sets belong to the K2 antenna port sets, and the K3 is a positive integer less than or equal to the K2; and the antenna port group includes a positive integer number of antenna ports.

In one embodiment, the first transmitter 801 includes at least the former two of the transmitter 416, the transmitting processor 415, the beam processor 471 and the controller/processor 440 mentioned in Embodiment 4.

In one embodiment, the second transmitter 802 includes at least the former two of the transmitter 416, the transmitting processor 415, and the controller/processor 440 mentioned in Embodiment 4.

In one embodiment, the second transceiver 803 includes at least the former three of the transmitter/receiver 416, the transmitting processor 415, the receiving processor 412, the beam processor 471 and the controller/processor 440 mentioned in Embodiment 4.

Embodiment 9

Figure 9:
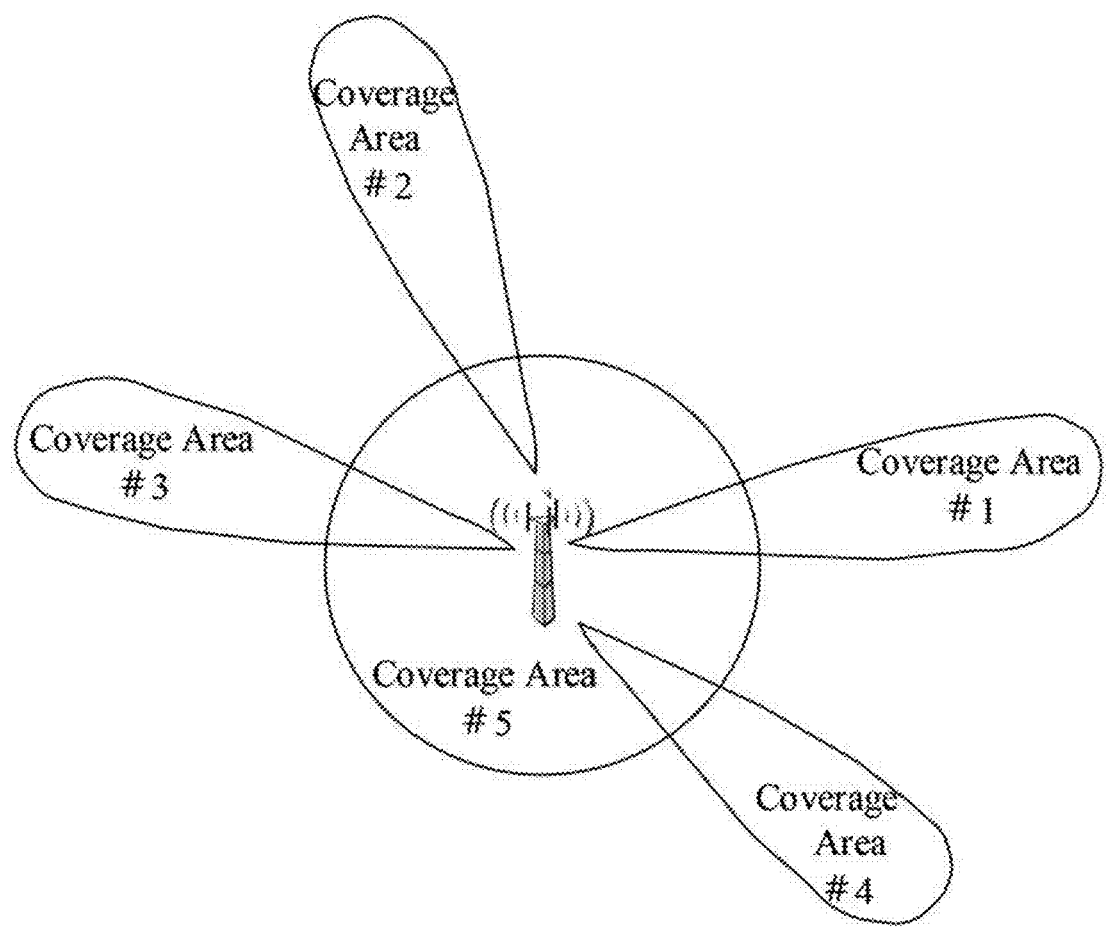
FIG. 9 is a diagram illustrating coverage areas of downlink transmission according to one embodiment of the disclosure.

Embodiment 9 illustrates an example of a diagram of coverage areas of downlink transmission, as shown in FIG. 9. In FIG. 9, coverage areas #{1, 2, 3, 4} correspond to four narrow beams respectively, and a coverage area #5 corresponds to an omnidirectional coverage (as shown by the circle).

In Embodiment 9, the shared offset in the disclosure is used for determining coverage areas #{1, 2, 3, 4, 5}, and four target offsets are used for determining coverage areas #{1, 2, 3, 4}; the four target offsets are four of the K1 target offsets.

In Subembodiment 1 of Embodiment 9, the shared offset is added to each of the four target offsets to obtain four specific offsets, the four specific offsets are used for determining four first-type channel qualities respectively, and the four first-type channel qualities are four of the K1 first-type channel qualities in the disclosure.

In Subembodiment 1 of Embodiment 9, the shared offset is added to each of the four target offsets to obtain four specific offsets, the four specific offsets are added to four second-type channel qualities to obtain four compensated channel qualities respectively, the four compensated channel qualities are used for determining four first-type channel qualities respectively, and the four first-type channel qualities are four of the K1 first-type channel qualities in the disclosure.

In Subembodiment 2 of Embodiment 9, configuration signalings of the four target offsets are transmitted by antenna ports corresponding to the four narrow beams respectively.

The ordinary skill in the art may understand that all or part steps in the above method may be implemented by instructing related hardware through a program. The program may be stored in a computer readable storage medium, for example Read-Only Memory (ROM), hard disk or compact disc, etc. Optionally, all or part steps in the above embodiments also may be implemented by one or more integrated circuits. Correspondingly, each module unit in the above embodiment may be realized in the form of hardware, or in the form of software function modules. The disclosure is not limited to any combination of hardware and software in specific forms. The UE or terminal in the disclosure includes but not limited to mobile phones, tablet computers, notebooks, vehicle-mounted communication equipment, wireless sensor, network cards, terminals for Internet of Things, REID terminals, NB-IOT terminals, Machine Type Communication (MTC) terminals, enhanced MTC (eMTC) terminals, data cards, low-cost mobile phones, low-cost tablet computers, and other wireless communication equipment. The base station in the disclosure includes but not limited to macro-cellular base stations, micro-cellular base stations, home base stations, relay base stations, and other radio communication equipment.

The above are merely the preferred embodiments of the disclosure and are not intended to limit the scope of protection of the disclosure. Any modification, equivalent substitute and improvement made within the spirit and principle of the disclosure are intended to be included within the scope of protection of the disclosure.

What is claimed is:

1. A method in a User Equipment (UE) for wireless communication, comprising:
    receiving a first information set, the first information set comprising K1 target offsets;
    receiving K1 target radio signals in K1 target time-frequency resource sets respectively; and
    determining K1 first-type channel qualities;
    wherein the K1 target radio signals are transmitted by K1 antenna port sets respectively;
    measurements for the K1 target radio signals are used for determining K1 second-type channel qualities respectively; any target offset of the K1 target offsets is in unit of decibel; the K1 is a positive integer greater than 1; the K1 second-type channel qualities are one-to-one corresponding to the K1 target offsets; one second-type channel quality and one corresponding target offset are used for determining one first-type channel quality; the antenna port set comprises a positive integer number of antenna ports; the K1 antenna port sets are Quasi Co-Located (QCLed), or the K1 target radio signals are associated with the same cell identifier; and
    the K1 first-type channel qualities are one-to-one corresponding to the K1 antenna port sets.

2. The method according to claim 1, comprising:
    transmitting second information;
    wherein the second information is used for determining K2 antenna port sets; the K2 antenna port sets are a subset of the K1 antenna port sets; the K2 is a positive integer; and the K1 first-type channel qualities are used for determining the K2 antenna port sets;
    or receiving K3 downlink radio signals;
    wherein the K3 downlink radio signals are transmitted by K3 antenna port groups respectively; K3 antenna port sets are used for determining the K3 antenna port groups respectively, the K3 antenna port sets belong to the K2 antenna port sets, and the K3 is a positive integer less than or equal to the K2; and the antenna port group comprises a positive integer number of antenna ports.

3. The method according to claim 1, comprising:
    receiving third information;
    wherein the third information comprises K1 pieces of third sub-information, and the K1 pieces of third sub-information are used for determining the K1 target time-frequency resource sets respectively;
    or receiving fourth information;
    wherein the fourth information is used for determining a shared offset, the shared offset is in unit of decibel, and the shared offset is used for determining the K1 first-type channel qualities.

4. The method according to claim 2, comprising:
    receiving a first signaling;
    wherein the first signaling is used for at least one operation of determining the K2 antenna port sets and triggering transmission of the second information.

5. The method according to claim 1, wherein the first information set comprises K1 pieces of first sub-information, the K1 pieces of first sub-information are used for determining the K1 target offsets respectively, and the K1 pieces of first sub-information are transmitted by the K1 antenna port sets respectively;

or, the target offset is related to at least one of an identifier of a corresponding antenna port set and a type of a channel transmitted on the corresponding antenna port set.

6. A method in a base station for wireless communication, comprising:
transmitting a first information set, the first information set comprising K1 target offsets; and
transmitting K1 target radio signals in K1 target time-frequency resource sets respectively;
wherein the K1 target radio signals are transmitted by K1 antenna port sets respectively; measurements for the K1 target radio signals are used for determining K1 second-type channel qualities respectively; any target offset of the K1 target offsets is in unit of decibel; the K1 is a positive integer greater than 1; the K1 second-type channel qualities are one-to-one corresponding to the K1 target offsets; one second-type channel quality and one corresponding target offset are used for determining one first-type channel quality; the antenna port set comprises a positive integer number of antenna ports; the K1 antenna port sets are Quasi Co-Located (QCLed), or the K1 target radio signals are associated with the same cell identifier; and the K1 first-type channel qualities are one-to-one corresponding to the K1 antenna port sets.

7. The method according to claim 6, comprising:
receiving second information;
wherein the second information is used for determining K2 antenna port sets; the K2 antenna port sets are a subset of the K1 antenna port sets; the K2 is a positive integer; and the K1 first-type channel qualities are used for determining the K2 antenna port sets;
or transmitting K3 downlink radio signals;
wherein the K3 downlink radio signals are transmitted by K3 antenna port groups respectively; K3 antenna port sets are used for determining the K3 antenna port groups respectively, the K3 antenna port sets belong to the K2 antenna port sets, and the K3 is a positive integer less than or equal to the K2; and the antenna port group comprises a positive integer number of antenna ports.

8. The method according to claim 6, comprising:
transmitting third information;
wherein the third information comprises K1 pieces of third sub-information, and the K1 pieces of third sub-information are used for determining the K1 target time-frequency resource sets respectively;
or transmitting fourth information;
wherein the fourth information is used for determining a shared offset, the shared offset is in unit of decibel, and the shared offset is used for determining the K1 first-type channel qualities.

9. The method according to claim 7, comprising:
transmitting a first signaling;
wherein the first signaling is used for at least one operation of determining the K2 antenna port sets and triggering transmission of the second information.

10. The method according to claim 6, wherein the first information set comprises K1 pieces of first sub-information, the K1 pieces of first sub-information are used for determining the K1 target offsets respectively, and the K1 pieces of first sub-information are transmitted by the K1 antenna port sets respectively;
or, the target offset is related to at least one of an identifier of a corresponding antenna port set and a type of a channel transmitted on the corresponding antenna port set.

11. A UE for wireless communication, comprising:
a first receiver, to receive a first information set, the first information set comprising K1 target offsets;
a second receiver, to receive K1 target radio signals in K1 target time-frequency resource sets respectively; and
a first transceiver, to determine K1 first-type channel qualities;
wherein the K1 target radio signals are transmitted by K1 antenna port sets respectively; measurements for the K1 target radio signals are used for determining K1 second-type channel qualities respectively; any target offset of the K1 target offsets is in unit of decibel; the K1 is a positive integer greater than 1; the K1 second-type channel qualities are one-to-one corresponding to the K1 target offsets; one second-type channel quality and one corresponding target offset are used for determining one first-type channel quality; the antenna port set comprises a positive integer number of antenna ports; the K1 antenna port sets are Quasi Co-Located (QCLed), or the K1 target radio signals are associated with the same cell identifier; and the K1 first-type channel qualities are one-to-one corresponding to the K1 antenna port sets.

12. The UE according to claim 11, wherein the first transceiver transmits second information, the second information is used for determining K2 antenna port sets, the K2 antenna port sets are a subset of the K1 antenna port sets, the K2 is a positive integer, and the K1 first-type channel qualities are used for determining the K2 antenna port sets;
or, the first transceiver receives K3 downlink radio signals, the K3 downlink radio signals are transmitted by K3 antenna port groups respectively, K3 antenna port sets are used for determining the K3 antenna port groups respectively, the K3 antenna port sets belong to the K2 antenna port sets, the K3 is a positive integer less than or equal to the K2, and the antenna port group comprises a positive integer number of antenna ports.

13. The UE according to claim 11, wherein the first receiver receives third information, the third information comprises K1 pieces of third sub-information, and the K1 pieces of third sub-information are used for determining the K1 target time-frequency resource sets respectively;
or the first receivers receives fourth information, the fourth information is used for determining a shared offset, the shared offset is in unit of decibel, and the shared offset is used for determining the K1 first-type channel qualities.

14. The UE according to claim 12, wherein the first transceiver receives a first signaling, and the first signaling is used for at least one operation of determining the K2 antenna port sets and triggering transmission of the second information.

15. The UE according to claim 11, wherein the first information set comprises K1 pieces of first sub-information, the K1 pieces of first sub-information are used for determining the K1 target offsets respectively, and the K1 pieces of first sub-information are transmitted by the K1 antenna port sets respectively;
or, the target offset is related to at least one of an identifier of a corresponding antenna port set and a type of a channel transmitted on the corresponding antenna port set.

16. A base station for wireless communication, comprising:
- a first transmitter, to transmit a first information set, the first information set comprising K1 target offsets; and
- a second transmitter, to transmit K1 target radio signals in K1 target time-frequency resource sets respectively; and
- a second transceiver, to receive second information;
- wherein the K1 target radio signals are transmitted by K1 antenna port sets respectively;
- measurements for the K1 target radio signals are used for determining K1 second-type channel qualities respectively; any target offset of the K1 target offsets is in unit of decibel; the K1 is a positive integer greater than 1; the K1 second-type channel qualities are one-to-one corresponding to the K1 target offsets; one second-type channel quality and one corresponding target offset are used for determining one first-type channel quality; the antenna port set comprises a positive integer number of antenna ports; the K1 antenna port sets are Quasi Co-Located (QCLed), or the K1 target radio signals are associated with the same cell identifier; the K1 first-type channel qualities are one-to-one corresponding to the K1 antenna port sets; the second information is used for determining K2 antenna port sets; the K2 antenna port sets are a subset of the K1 antenna port sets; the K2 is a positive integer; and the K1 first-type channel qualities are used for determining the K2 antenna port sets.

17. The base station according to claim 16, wherein the second transceiver transmits K3 downlink radio signals; the K3 downlink radio signals are transmitted by K3 antenna port groups respectively; K3 antenna port sets are used for determining the K3 antenna port groups respectively, the K3 antenna port sets belong to the K2 antenna port sets, and the K3 is a positive integer less than or equal to the K2; and the antenna port group comprises a positive integer number of antenna ports.

18. The base station according to claim 16, wherein the first transmitter transmits third information, the third information comprises K1 pieces of third sub-information, and the K1 pieces of third sub-information are used for determining the K1 target time-frequency resource sets respectively;
- or the first transmitter transmits fourth information, the fourth information is used for determining a shared offset, the shared offset is in unit of decibel, and the shared offset is used for determining the K1 first-type channel qualities.

19. The base station according to claim 17, wherein the second transceiver transmits a first signaling, and the first signaling is used for at least one operation of determining the K2 antenna port sets and triggering transmission of the second information.

20. The base station according to claim 16, wherein the first information set comprises K1 pieces of first sub-information, the K1 pieces of first sub-information are used for determining the K1 target offsets respectively, and the K1 pieces of first sub-information are transmitted by the K1 antenna port sets respectively;
- or, the target offset is related to at least one of an identifier of a corresponding antenna port set and a type of a channel transmitted on the corresponding antenna port set.

* * * * *